United States Patent
Hohwald et al.

(10) Patent No.: US 11,017,019 B1
(45) Date of Patent: May 25, 2021

(54) STYLE CLASSIFICATION FOR AUTHENTIC CONTENT SEARCH

(71) Applicant: SHUTTERSTOCK, INC., New York, NY (US)

(72) Inventors: Heath Hohwald, Logrono (ES); David Chester, Brooklyn, NY (US)

(73) Assignee: Shutterstock, Inc., New York, NY (US)

( * ) Notice: Subject to any disclaimer, the term of this patent is extended or adjusted under 35 U.S.C. 154(b) by 663 days.

(21) Appl. No.: 15/236,357

(22) Filed: Aug. 12, 2016

Related U.S. Application Data

(60) Provisional application No. 62/205,620, filed on Aug. 14, 2015.

(51) Int. Cl.
| | |
|---|---|
| *G06F 16/58* | (2019.01) |
| *G06F 3/0482* | (2013.01) |
| *G06F 16/51* | (2019.01) |
| *G06F 16/9535* | (2019.01) |
| *G06F 16/2457* | (2019.01) |

(52) U.S. Cl.
CPC ........ *G06F 16/5866* (2019.01); *G06F 3/0482* (2013.01); *G06F 16/24578* (2019.01); *G06F 16/51* (2019.01); *G06F 16/9535* (2019.01)

(58) Field of Classification Search
CPC ......... G06F 17/30247; G06F 17/30256; G06F 17/3053; G06F 17/30802; G06F 17/30817; G06F 17/30958; G06F 17/30253; G06F 17/30268; G06F 17/30277; G06F 17/30598; G06F 17/30731; G06F 16/5866; G06F 16/21; G06F 16/9535; G06F 16/24578; G06F 3/0482; G06F 16/51; G06F 16/285; G06F 16/35; G06F 16/355
USPC ......... 707/726, 758, E17.014, E17.023, 603, 707/723, 736, 749, 999.107, 728
See application file for complete search history.

(56) References Cited

U.S. PATENT DOCUMENTS

| | | | | |
|---|---|---|---|---|
| 8,874,566 | B2 * | 10/2014 | Robert | G06F 16/951 |
| | | | | 707/726 |
| 2003/0196094 | A1 * | 10/2003 | Hillis | G06F 21/64 |
| | | | | 713/179 |
| 2005/0004889 | A1 * | 1/2005 | Bailey | G06Q 30/02 |
| 2005/0004905 | A1 * | 1/2005 | Dresden | G06F 16/951 |

(Continued)

*Primary Examiner* — Alford W Kindred
*Assistant Examiner* — Cecile H Vo
(74) *Attorney, Agent, or Firm* — McDermott Will & Emery LLP

(57) ABSTRACT

Various aspects of the subject technology relate to systems, methods, and machine-readable media for authentic content search using style classifications. A system may be a search engine that uses a set of style classifiers to detect one or more styles associated with an image and a logistic regression model to determine a level of authenticity for the image based on the associated styles. Training images are fed to train a series of neural networks that output a set of style classifiers. An image is processed through the style classifiers to determine respective probabilities for each style classification. The results from the set of style classifiers are then input to the logistic regression model to determine an authenticity score for the image. For example, the authenticity score shows how authentic is an image (e.g., a score of 1.0 refers to 100% authenticity, whereas a score of 0.0 represents a non-authentic image).

19 Claims, 11 Drawing Sheets

(56) References Cited

U.S. PATENT DOCUMENTS

| | | | |
|---|---|---|---|
| 2005/0120006 A1* | 6/2005 | Nye | G06F 16/35 |
| 2008/0089591 A1* | 4/2008 | Zhou | G06K 9/6292 |
| | | | 382/224 |
| 2012/0066203 A1* | 3/2012 | Robert | G06F 16/951 |
| | | | 707/711 |
| 2015/0254555 A1* | 9/2015 | Williams, Jr. | G06N 3/0454 |
| | | | 706/14 |
| 2016/0224593 A1* | 8/2016 | Qiu | G06F 16/583 |
| 2016/0350336 A1* | 12/2016 | Checka | G06K 9/4628 |

* cited by examiner

STYLE CLASSIFICATION FOR AUTHENTIC CONTENT SEARCH

CROSS-REFERENCE TO RELATED APPLICATIONS

This application claims the benefit of priority from U.S. Provisional Application No. 62/205,620, entitled "STYLE CLASSIFICATION FOR AUTHENTIC CONTENT SEARCH," filed Aug. 14, 2015, the entirety of which is incorporated herein by reference.

BACKGROUND

Field

The present disclosure generally relates to a computer-based image retrieval system, and more particularly to image retrieval using style classification for authentic content search.

Description of the Related Art

Customers commonly search for content such as stock content items for producing a creative illustration using the searched stock content items. The customers can search for such stock content through a media collection. However, customers may desire content that does not look staged, but rather more authentic, and may have difficulty finding such authentic-looking content using a search query.

SUMMARY

The disclosed system provides a search engine using a set of style classifiers that detects one or more styles associated with an image from a set of example images and a logistic regression model that runs an algorithm to determine a level of authenticity for the image. The logistic regression model is one example of a classifier that is a type of neural network that can be used to determine the level of authenticity for an image, where any classifier that accepts the style probabilities and maps them to a probability of being authentic may be implemented. The system has a database of training images for training a series of neural networks to produce the set of style classifiers. The neural networks transform the training images into complex vector representations that then map to a probability of being an instance of a particular style as part of a corresponding style classifier model. For each example image from a collection of images, the image is first processed through the set of style classifiers to determine respective probabilities for each style classification. The results from the set of style classifiers may be combined as an input to the logistic regression model to determine an authenticity score for the image. For example, the authenticity score shows how authentic an image is (e.g., a score of 1.0 refers to 100% authentic, whereas a score of 0.0 refers to a non-authentic image).

According to one embodiment of the present disclosure, a computer-implemented method is provided for receiving user input identifying a search query from a client device, the search query indicating a request for authentic content; identifying one or more image identifiers corresponding to the search query; determining a collection of images associated with the one or more image identifiers; determining images from the collection of images that contain authentic content based on an authenticity score associated with each of the images, the authenticity score indicating a probability that the image contains authentic content; and providing a prioritized listing of images determined to contain authentic content to the client device.

According to one embodiment of the present disclosure, a system is provided including one or more processors and a computer-readable storage medium coupled to the one or more processors, the computer-readable storage medium including instructions that, when executed by the one or more processors, cause the one or more processors to receive a search query identifying one or more search terms; determine that the one or more search terms respectively correspond to one or more image identifiers; identify a collection of images corresponding to one or more image identifiers; determine an authenticity probability for each image in the collection of images; identify a subset of images having authenticity probabilities that exceed a predetermined threshold, the predetermined threshold identifying a boundary between authentic and non-authentic content; generate search results identifying a prioritized listing of the subset of the images; and provide the search results for display on a client device.

According to one embodiment of the present disclosure, a non-transitory computer readable storage medium is provided including instructions that, when executed by a processor, cause the processor to receive a search query identifying one or more search terms for initiating an image search, the search query indicating a request for images with authenticity scores that exceed a predetermined threshold, the predetermined threshold identifying a boundary between authentic and non-authentic content, the search query being received from a client application via a user interface of a client device; identify a collection of images corresponding to one or more image identifiers; determine an authenticity probability for each image in the collection of images; identify a subset of images having authenticity probabilities that exceed the predetermined threshold; generate search results identifying a prioritized listing of the subset of the images; and provide the search results for display on the client device via the client application.

According to one embodiment of the present disclosure, a system is provided that includes means for receiving user input identifying a search query from a client device, the search query indicating a request for authentic content and means for 1) identifying one or more image identifiers corresponding to the search query; 2) determining a collection of images associated with the one or more image identifiers; 3) determining images from the collection of images that contain authentic content based on an authenticity score associated with each of the images, the authenticity score indicating a probability that the image contains authentic content; and 4) providing a prioritized listing of images determined to contain authentic content to the client device.

According to one embodiment of the present disclosure, a computer-implemented method is provided for receiving user input via an application on a client device, the user input indicating a request to initiate an image search for authentic content; generating, in response to the received user input, an image search query including one or more search terms from the user input; providing for transmission the image search query over a connection to a server, the server including an image search service that identifies one or more images that contain authentic content based on an authenticity probability associated with each of the one or more images, the authenticity probability indicating a level of authenticity for the image, the authenticity probability being based on an aggregation of style class probabilities, each of the style class probabilities indicating a likelihood that a subject image is a member of a corresponding style class; receiving a prioritized listing of images over the connection in response to the image search query; and providing for display the prioritized listing of images.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

Figure 1:
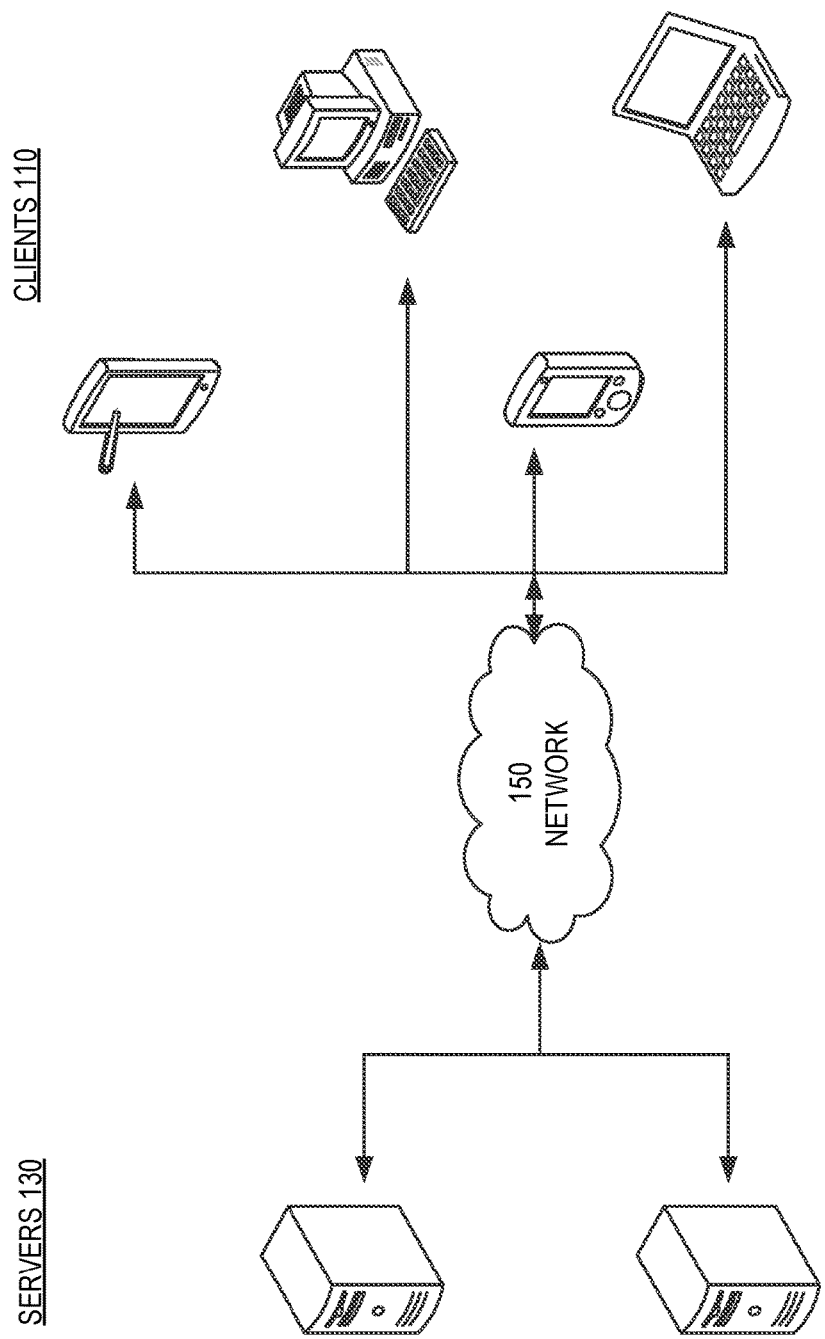
FIG. 1 illustrates an example architecture for an authentic content search by style classification suitable for practicing some implementations of the disclosure.

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

As used herein, the term "content item" may be, for example, in reference to a digital document that is composed of one or more media elements of different types (text, image, video, audio, etc.). A content item can be a single picture or a single video file. The term "authentic" may be, for example, in reference to an image showing a representation of a natural scene, where, for example, if a camera or other recording device were not present, the captured image, video, or audio, would have nonetheless occurred naturally. The term "image identifier" as used herein may refer to a form of metadata such as a tag and/or a label associated with an image for identifying the image.

In an information retrieval (IR) system, the IR system may use search query terms and/or other user input to perform a search through the repository containing both authentic and non-authentic content items. When a user performs a search, the IR system matches a user's search terms with content items that are most relevant to a user's query. One challenge with this approach is identifying stock images that appear authentic and most relevant to the user's query. In some IR systems, a content repository can include content (e.g., images, videos, audio, etc.) that appears authentic (e.g., closely resemble a naturally-occurring situation) and content that appears non-authentic (e.g., staged). There is a problem with current image search engines in that when a user searches for stock images, a standard approach is to classify the images in the repository and then perform the search using that particular classification, thereby increasing the amount of computer resources needed and overall latency of the image search when multiple style classifications are traversed to complete the image search.

The disclosed system addresses this problem specifically arising in the realm of computer technology by providing a solution also rooted in computer technology, namely, by considering a search engine system using a style classifier covering a set of styles intrinsic to authentic media. The style classifier can classify the strength with which an image exhibits certain known styles. The system may use an algorithm that detects the set of styles from a set of example images, referred to as training data. The disclosed system includes training of a series of computer-operated neural networks, such as a convolutional neural network, to teach the neural network to identify features of images mapping to certain style classes for identifying those images that are responsive to an input search query with a probability that the images are deemed authentic. In certain aspects, the convolutional neural network is operated on a server and accesses large amounts of image data stored in memory of the server or stored elsewhere and accessible by the server in order to train the convolutional neural network.

For example, a set of training images may be provided to the convolutional neural network in order to teach the convolutional neural network to identify features of a training image, then process those features against a number of style classes that respectively correspond to a different level of authenticity. The disclosed system produces a set of vectors representing the style classifications for the corpus of images in the training data. The styles are learned from running the convolutional neural network over a corpus of the training data. The search engine system can use a second model composed of a set of weighted probability data points where each weighted data point corresponds to a different style. Each weighted data point represents a likelihood that the corresponding style is an authentic style. The disclosed system determines the probability that such training image contains authentic content based on the probabilistic computations per style class for that training image. For example, the results from the set of style classifiers may be combined to form resultant detected styles for an image, which are then scored against the second model to determine the image's authenticity score. For example, the authenticity score shows how authentic an image appears to be (e.g., a score of 1.0 refers to 100% authentic, whereas a score of 0.0 refers to a completely "fake" or a completely staged image). Once the convolutional neural network has been trained to predict probabilistically which features of the training images identify certain style classes with a level of authenticity, the disclosed system generates metadata for each example image with a corresponding authenticity probability.

The subject system provides several advantages including providing classified styles or other classifications to content items for filtering through content that is most relevant to a user's search query for authenticity. The system provides a machine learning capability where the system can learn from a content item and associated styles in order to refine search results with highly-relevant content items. In this regard, the refined search results would yield content items with a range of authenticity scores so that the user can select a content item that is determined to have a highly authentic appearance. With this approach, the system can continually improve its accuracy (and keep up with trending differences of what authentic looks like) by incorporating online learning into its authenticity model. By presenting results to the user, and identifying the media that a user interacts with (indicating positive results), and examining the results that a user ignores (indicating negative results), the system can continually learn and refine itself to match user preferences.

The proposed solution further provides improvements to the functioning of the computer itself because it saves data storage space and reduces network usage. Specifically, the computer hosting the collection of images to be searched is not required to maintain in data storage or repeatedly share over a network with the convolutional neural network classification information based on the trained images to be searched because the convolutional neural network, once trained, is configured to predict which features of the images in the collection of images correlated to particular style classes of varying levels of authenticity corresponding to those features without this information.

Although many examples provided herein describe a user's search inputs being identifiable, or download history for authentic or non-authentic images being stored, each user may grant explicit permission for such user information to be shared or stored. The explicit permission may be granted using privacy controls integrated into the disclosed system. Each user may be provided notice that such user information will be shared with explicit consent, and each user may at any time end having the information shared, and may delete any stored user information. The stored user information may be encrypted to protect user security.

FIG. 1 illustrates an example architecture 100 for providing a set of authentic content images identified as responsive to an image search query from a user based on style classifications having varying degrees of authenticity. The architecture 100 includes servers 130 and clients 110 connected over a network 150.

One of the many servers 130 is configured to host a computer-operated neural network. The neural network, which can be a convolutional neural network, is trained to identify features of images corresponding to one or more image identifiers. One of the many servers 130 also hosts a collection of images. The collection of images can be searched using an image search engine (e.g., accessible through a web page on one of the clients 110). Images from the collection can also be used to train the neural network to identify features of the images and, with the addition of data indicating a degree of authenticity, once identified, are likely to indicate whether the image contains authentic content. The servers 130 can return images tagged with a corresponding authenticity score to the clients 110 in response to a search query. For purposes of load balancing, multiple servers 130 can host the neural network and multiple servers 130 can host the collection of images.

The servers 130 can be any device having an appropriate processor, memory, and communications capability for hosting the neural network, the collection of images, and the image search engine. The image search engine is accessible by various clients 110 over the network 150. The clients 110 can be, for example, desktop computers, mobile computers, tablet computers (e.g., including e-book readers), mobile devices (e.g., a smartphone or PDA), or any other devices having appropriate processor, memory, and communications capabilities for accessing the image search engine on one of the servers 130. The network 150 can include, for example, any one or more of a local area network (LAN), a wide area network (WAN), the Internet, and the like. Further, the network 150 can include, but is not limited to, any one or more of the following network topologies, including a bus network, a star network, a ring network, a mesh network, a star-bus network, tree or hierarchical network, and the like.

Figure 2:
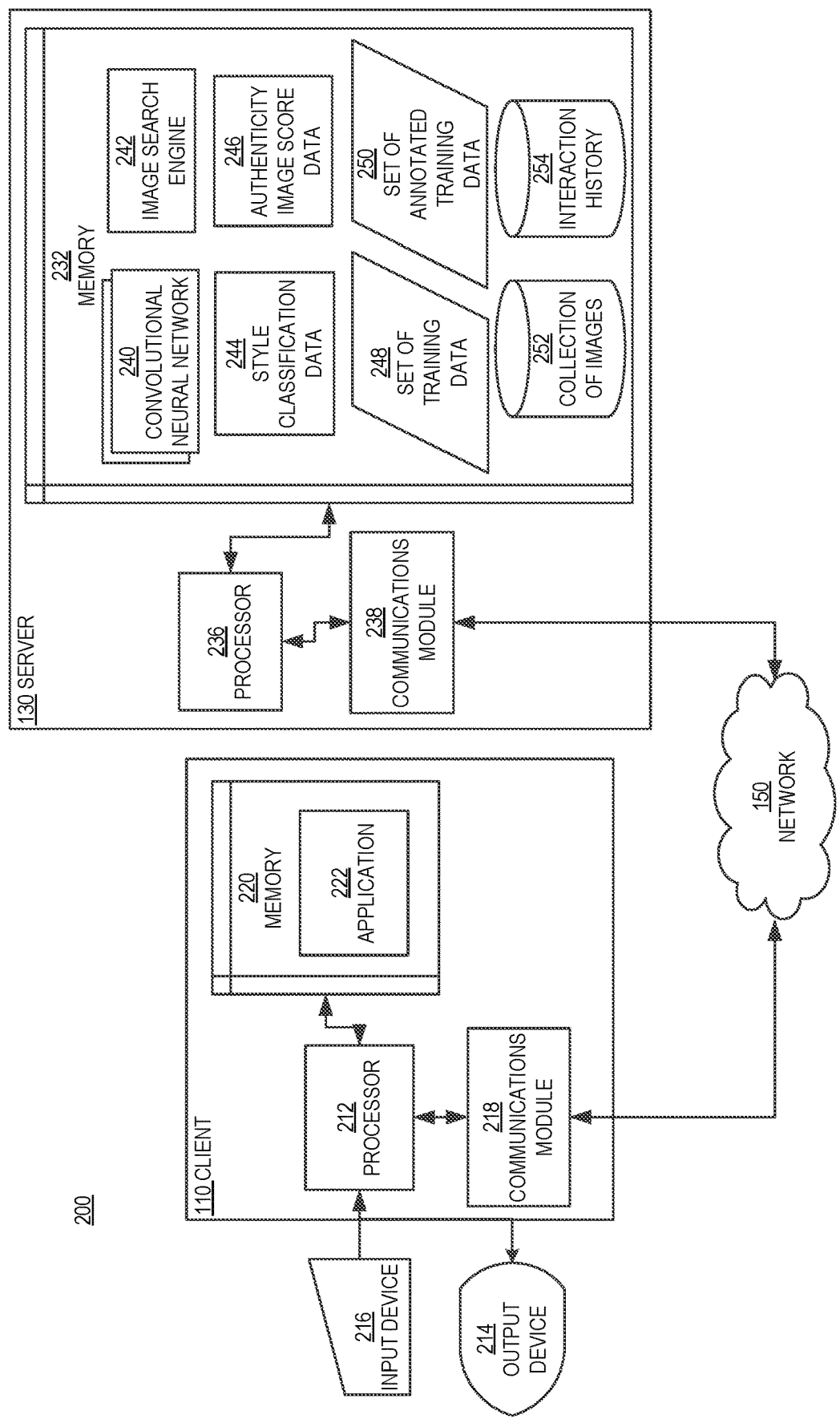
FIG. 2 is a block diagram illustrating an example client and server from the architecture of FIG. 1 according to certain aspects of the disclosure.

FIG. 2 is a block diagram 200 illustrating an example server 130 and client 110 in the architecture 100 of FIG. 1 according to certain aspects of the disclosure. The client 110 and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The server 130 includes a memory 232, a processor 236, and a communications module 238. The memory 232 of the server 130 includes a convolutional neural network 240. In one or more implementations, the convolutional neural network 240 may be a series of neural networks, one neural network for each style classification. As discussed herein, a convolutional neural network 240 is a type of feed-forward artificial neural network where individual neurons are tiled in such a way that the individual neurons respond to overlapping regions in a visual field. The architecture of the convolutional neural network 240 may be in the style of existing well-known image classification architectures such as AlexNet, GoogLeNet, or Visual Geometry Group models. In certain aspects, the convolutional neural network 240 consists of a stack of convolutional layers followed by several fully connected layers. The convolutional neural network 240 can include a loss layer (e.g., softmax or hinge loss layer) to back propagate errors so that the convolutional neural network 240 learns and adjusts its weights to better fit provided image data.

The memory 232 also includes a collection of images 252 and an image search engine 242 for searching the collection of images 252. In one or more implementations, the collection of images 252 represents a database that contains, for each image, a mapping from an image identifier to a data file containing pixel data for the image (e.g., in jpeg format). Also included in the memory 232 of the server 130 is a set of training data 248. The set of training data 248 can be, for example, a dataset of content items (e.g., images) corresponding to a predetermined number of style classes (e.g., about 10 to 20 style classes) with a predetermined number of content items (e.g., about 10,000 images) per style class. The predetermined number of style classes may include, for example, a style class for abstract images, logo images, icon images, isolated images, texture images, Instagram images, illustration images, background images, stocky people images, high dynamic range (HDR) images, collection images, macro images, candid people images, vector images, pattern images, etc. The set of training data 248 may include multiple instances (or sets) of training data, where each instance (or set) of training data is associated with a particular style class. In some embodiments, the set of training data 248 includes a label indicating the style class strength (e.g., very candid, somewhat candid, not candid) as well as the images. The set of training data 248 also may include image vector information and image cluster information, in which the image vector information identifies training vectors representing a large sample of training images and the image cluster information identifies clusters representing respective semantic concepts. In this respect, the vectors corresponding to a semantic concept (e.g., coffee) are clustered into one cluster representing that semantic concept. In one or more implementations, the set of training data 248 may be populated with public domain images from third-party photo sharing websites. In this respect, the set of training data 248 may include a labeled data set that has a stock photography website's images labeled as "non-authentic" and a photo sharing image collection labeled as "authentic."

The memory 232 also include a set of annotated training data 250. The set of annotated training data 250 may be targeted data gathered via third-party crowd-sourcing platforms (e.g., MTurk, CrowdFlower, etc.). The set of annotated training data 250 may include images from the collection of images 252 that are human annotated with information indicating a level of authenticity of the image according to a user that judged the image via one of the third-party crowd-sourcing platforms. The set of annotated training data 250 may be utilized to further refine the training of the convolutional neural network 240.

The collection of images 252 can be, for example, a dataset of trained images corresponding to a number of style classes (e.g., about 25). Each of the images may include an indication of its respective level of authenticity based on the corresponding style classes applicable to the image. The images may be paired with image vector information and image cluster information. The image vector information identifies vectors representing a large sample of images (e.g., about 50 million) and the image cluster information identifies the vectors in one or more clusters such that each of the cluster of images represents a semantic concept.

Although the set of training data 248 is illustrated as being separate from the collection of images 252, in certain aspects the set of training data 248 is a subset of the collection of images 252. Furthermore, although the collection of images 252 and the image search engine 242 are illustrated as being in the same memory 232 of a server 130 as the convolutional neural network 240, in certain aspects the collection of images 252 and the image search engine 242 can be hosted in a memory of a different server but accessible by the server 130 illustrated in FIG. 2.

The memory 232 includes style classification data 242. The style classification data 242 may include information about style classifications available for the image search. The information may be metadata and/or labels identifying parameters for each of the style classifications. The style classification data 242 may identify a number of style classes such as abstract, logo, icon, isolated, texture, Instagram, illustration, background, stocky people, high dynamic range (HDR), collection, macro, candid people, vector art, pattern, etc. The parameters may indicate a range of vector values that correspond to a particular style class such that the image search engine 242 may correlate the extracted image vector to vector values for a given style class. The values from the style classification data 242 may be accessible to the convolutional neural network 240 and/or the image search engine 242 in parallel for different style classes.

The memory 232 also includes authenticity image score data 246. The authenticity image score data 246 includes an array of authenticity scores for images in the collection of images 252. In one or more implementations, the authenticity image score data 246 may include metadata that indicates an association between a given authenticity score and a corresponding image in the collection of images 252. The authenticity image score data 246 may be indexed in categories such that the authenticity scores may be accessible in groupings (e.g., authentic, somewhat authentic, non-authentic). The authenticity image score 246 may include a probability breakdown identifying each style class associated with a corresponding authenticity probability. For example, an authenticity score for one image may include a distribution identifying four detected style classes with different authenticity probabilities, where the sum of the probabilities equates to 1.0 (e.g., stock with probability 0.25, illustration with probability 0.15, vector art with probability 0.05, and candid with probability 0.55).

In some aspects, the processor 236, using the style classification data 244 and the authenticity image score data 246, can tag each of the images in the collection of images 252 with metadata identifying an index to a corresponding authenticity score in the authenticity image score data 246 and an index to a style class in the style classification data 244. The tagging can serve as an indication of an association between a corresponding authenticity score and one or more style classes. The metadata may be a metadata file stored as a flat document or an index identifying a storage location in the collection of images 252. For example, the metadata file may include one or more rows of data including an image identifier, an image URL and a style identifier (e.g., identifying the corresponding style class).

The memory 232 also includes interaction history data 254. In certain aspects, the processor 236 is configured to determine the interaction history data 254 by obtaining user interaction data identifying interactions with images from image search results that are responsive to search queries. In this respect, the search results may be personalized based on the authenticity level of the most-recent images downloaded or clicked by the user. For example, the processor 236 may determine that a user interacted with an image from a search result, such as, by clicking on the image, saving the image for subsequent access, or downloaded the image to a client (e.g., client 110), or the like. The processor 236 may keep track of the user interactions with a number of images over a given time period. In one or more implementations, the processor 236 may track the authenticity value of the last N images that the user interacted with as well as a current user query, where N is a positive integer value. The interaction history 254 may also include data indicating search behavior (and/or patterns) relating to prior image search queries.

The processor 236 of the server 130 is configured to execute instructions, such as instructions physically coded into the processor 236, instructions received from software in memory 232, or a combination of both. For example, the processor 236 of the server 130 executes instructions to submit a plurality of training images containing content identifying different semantic concepts (e.g., woman, coffee) to the convolutional neural network 240 that is configured to analyze image pixel data for each of the plurality of training images to identify features, in each of the plurality of training images, corresponding to a particular semantic concept and receive, from the convolutional neural network 240 and for each of the plurality of training images, an identification of one or more style classes corresponding to the image processed by the convolutional neural network 240.

In certain aspects, the processor 236 of the server 130 is configured to receive a user input from a user. The user input identifies a search query in a given natural language. For example, the search query may be entered as an English term. A user of the client 110 may use the input device 216 to submit a search term or phrase via a user interface of the application 222. The user interface may include an input section where the search term or phrase may be typed in, for example. The input section may include one or more controls to allow the user to initiate the image search upon receiving the search query. In some aspects, the image search may be initiated automatically upon receiving at least one search term (or at least the search phrase in part). As described herein, the number of natural languages used is not limited to English, and the number of natural languages can vary to include other natural languages depending on implementation.

The search query is then provisioned to the image search engine 242 for initiating the image search through the collection of images 252. The user input is provided, for example, by the user accessing the image search engine 242 over the network 150 using the application 222 in the memory 220 on the client 110 of the user, and the user submitting the user input using the input device 216 of the client 110. For example, the user may use the input device 216 to enter the text-based search term or phrase. In response to the user input via the application 222, a processor of the client 110 is configured to transmit the search query over the network 150 using the communications module 218 of the client 110 to the communications module 238 of the server 130.

The processor 236 of the server 130, upon receiving the search query for the image search engine 242, is configured to submit a search request for the search query to the image search engine 242. The processor 236 then receives an identification of a plurality of images, with varying levels of authenticity (e.g., using the authenticity image score data 246), from the collection of images 252 that are responsive to the search query, and is configured to provide a listing of images with a ranking (or prioritization) according to an authentic search probability (e.g., using the interaction history data 254). The listing of images that is prioritized (or ranked) according to the user interaction probabilities is provided, for example, by the processor 236 of the server 130 being configured to submit a set of training images (e.g., the set of training data 248, the set of annotated training data 250) to the convolutional neural network 240 prior to the search query being received, and the processor 236, using a logistic regression model, identifying the level of authenticity for each of the images in the collection of images 252. The processor 236 may then provide the listing of images to the application 222 on the client 110 over the network 150 for display by an output device 214 of the client 110.

Figure 3A:
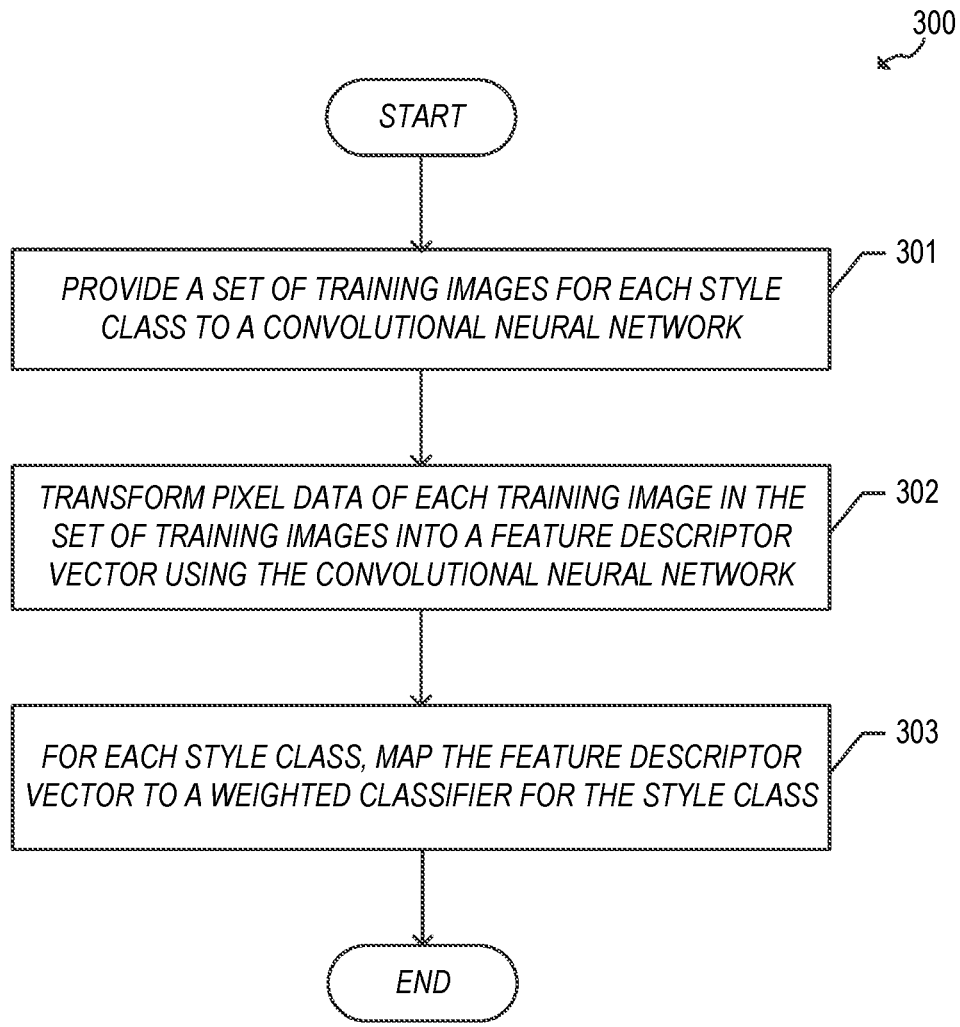
FIG. 3A illustrates an example process for training a convolutional neural network to analyze image pixel data to form a style classifier model using the example server of FIG. 2.

FIG. 3A illustrates an example process 300 for training a convolutional neural network to analyze image pixel data to produce a style classifier model using the example server of FIG. 2. While FIG. 3A is described with reference to FIG. 2, it should be noted that the process steps of FIG. 3A may be performed by other systems.

The process 300 begins by proceeding from start step to step 301 when a set of training data 248 (e.g., training images) is fed through a convolutional neural network 240. For example, the convolutional neural network 240 can consist of a stack of eight layers with weights, the first five layers being convolutional layers and the remaining three layers being fully-connected layers. The set of training data 248 can be fixed-size 242×242 pixel Black-White image data or Red-Green-Blue (RGB) image data. In one or more implementations, the set of training data 248 includes a data file containing pixel data for each training image. The set of training data 248 may include a different set of training images for each style class. For example, the set of training data 248 may include a first set of training images representing a candid style class, and a second set of training images representing a vector art style class. The number of sets (or instances) of the training data included in the set of training data 248 may be an arbitrary number and may vary depending on implementation.

Subsequently, in step 302, the convolutional neural network 240 transforms pixel data of each training image in the set of training images into a feature descriptor vector. For example, the convolutional neural network 240 extracts feature descriptors from the training images. The convolutional neural network 240 processes the set of training data 248 in order to learn to identify a correlation between an image and a style classification by analyzing pixel data of the image. Training with the set of training data 248 may be regularized by weight decay and dropout regularization for the first two fully-connected layers with a dropout ratio set to 0.5, and the learning rate may initially be set to $10^{-2}$ and then decreased by a factor of 10 when validation set accuracy stops improving for the convolutional neural network 240. The feature extraction algorithm executed by the convolutional neural network 240 may be implemented with three fully connected layers of the convolutional neural network 240. The extracted features (or feature descriptor vectors) may be then fed into a multinomial logistic regression to map them to respective image style classes.

Next in step 303, the convolutional neural network 240, for each style class, maps corresponding feature descriptor vectors to a weighted classifier model for the style class. For example, feature descriptor vectors indicating features relating to a candid style class are mapped to a "candid" classifier. The process to produce a single style classifier ends following step 303.

In one or more implementations, one or more regression and/or calibration flow operations are performed to find optimal values for the set of style classifiers. For example, a set of annotated training images is input back into the set of style classifiers to produce a refined distribution of style probability values across the set of style classes to determine a more accurate style (or styles) the image most likely represents.

Figure 3B:
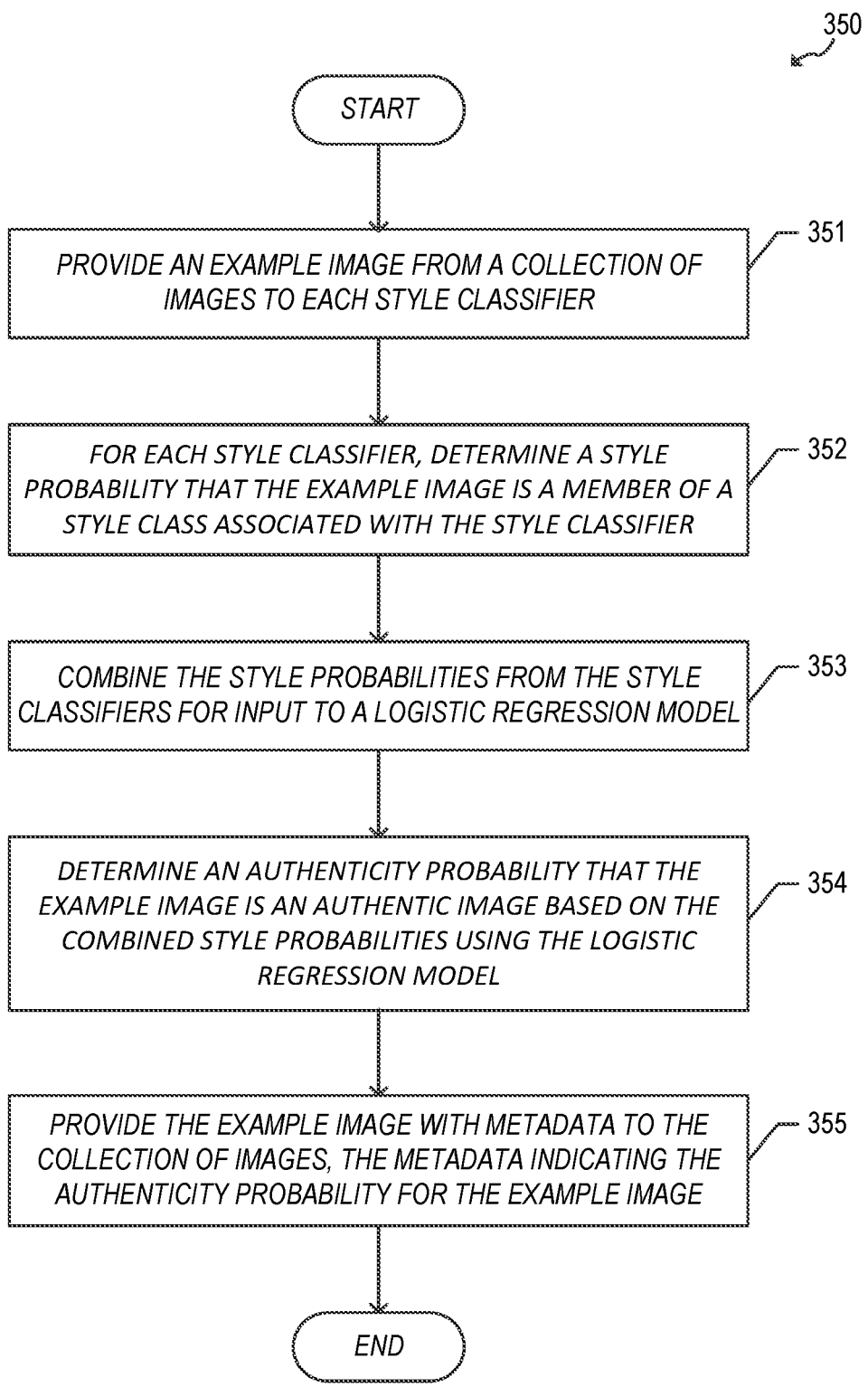
FIG. 3B illustrates an example process for training a logistic regression model to analyze style class probabilities to identify authenticity probabilities in example images using the example server of FIG. 2.

FIG. 3B illustrates an example process 350 for training a logistic regression model to analyze style class probabilities to identify authenticity probabilities in example images using the example server of FIG. 2. While FIG. 3B is described with reference to FIG. 2, it should be noted that the process steps of FIG. 3B may be performed by other systems.

The process 350 begins by proceeding from start step to step 351 when an example image from the collection of images 252 is fed through each of the style classifier models to determine respective style probabilities for each style class.

Next, in step 352, for each style class, the style classifier determines a style probability that the example image is a member of that style class. Each of the probability values indicates the likelihood that an image is a member of a subject style class based on pixel data of the image. In one or more implementations, an identifier such as a tag or a label associated with the example image may be used by the style classifier to determine the degree of association between the example image and the subject style class.

Subsequently, in step 353, the style probabilities from the style classifiers are combined together for input to a logistic regression model. The logistic regression model is one example of a classifier that is a type of neural network, where any classifier that can accept probability values and map them to another probability value may be implemented. In one or more implementations, the logistic regression model represents a two-dimensional probability waveform, where the x-dimension refers to the compiled style classes and the y-dimension refers to probability values corresponding to the respective style classes.

In step 354, the logistic regression model determines an authenticity probability that the example image is an authentic image based on the combined style probabilities for the example image. The logistic regression model may include a mapping between a level of authenticity and a subject style class, such that the logistic regression model may index the authenticity probability based on a given subject style class. The logistic regression model may be configured to run one or more iterations for determining a final authenticity probability for a given example image.

Next, in step 355, the logistic regression model provides the example image with metadata to the collection of images 252. In some embodiments, the metadata indicates the authenticity probability for the example image. In some aspects, the authenticity probabilities represent authenticity scores in a scale of 0 to 100 (where 100 represents most authentic, and 0 represents most non-authentic). The operation of building an image search space with proper metadata (e.g., the collection of images 252) may be performed recursively in a closed loop until a set of example images, for a given style class and/or a set of style classes, includes a range of images with varying authenticity scores.

In some aspects, the logistic regression model runs a specialized authenticity algorithm to generate an authenticity score for a given image for different style classifications that would be responsive to image search queries. The authenticity score represents a high-level prediction of the searched content item being an authentic image, for example. The logistic regression model may include a distribution waveform of probabilities across a number of style classes. Each of the probabilities corresponds to a respective level of authenticity under a given style class. The logistic regression model may compute a final authenticity score for an image by iteratively processing the input style class probabilities by logical regression.

In one or more implementations, weights may be applied to the logistic regression model. A weight value may be applied to one style class. For example, a certain weight may represent that a style class is highly unlikely related to authentic content (such as a style class for "pencil sketch" images). In some aspects, the weights assigned to each of the compiled style classes may be adjustable by a user.

Figure 4:
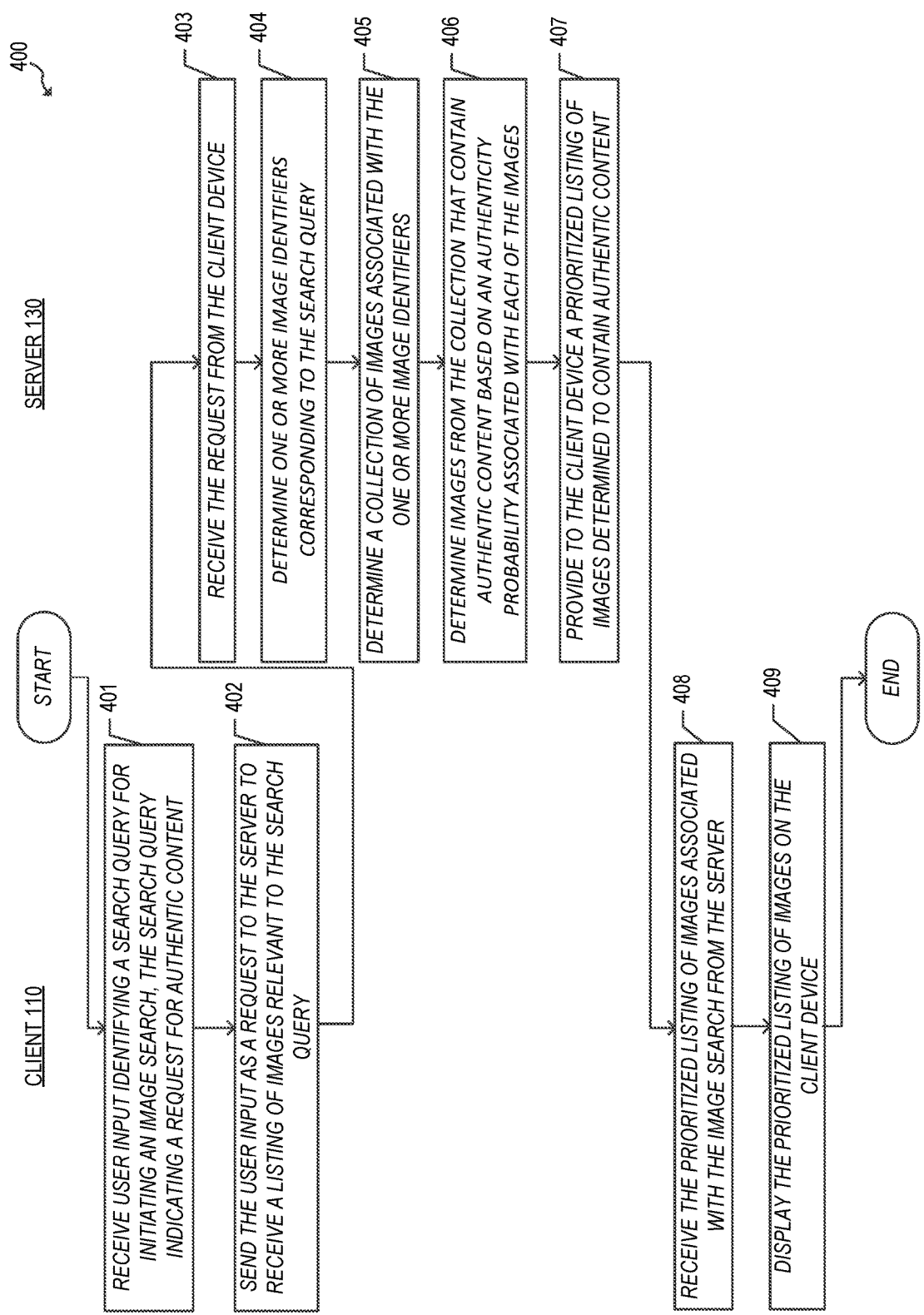
FIG. 4 illustrates an example process for authentic content search by style classification using the example client and server of FIG. 2.

FIG. 4 illustrates an example process 400 for authentic content search by style classification using the example client and server of FIG. 2. The process 400 begins in step 401 when a user, for example, loads an application 222 on a client 110 and the client 110 receives an input from the user using the input device 216 for a search query for a collection of images 252. The input identifies one or more search terms in a given natural language for initiating an image search of authentic content. The user input may include one or more search terms, phrases, sentences and/or suitable characters that trigger the image search engine 242 to search through the collection of images 252. In this respect, a search engine may identify images that are responsive to a search query by identifying images of a level of authenticity based on one or more style classes to which the identified image may be a member. The user can utilize the input device 216 to submit one or more search terms as part of a text-based search query via a user interface of the application 222. In some embodiments, the search query indicates a request for authentic content. For example, the user may set an indication via the application 222 that the user prefers a listing of images that contains a larger proportion of images showing authentic content compared to non-authentic content.

Next, in step 402, the application 222 on the client 110 sends the user input as a request to the server 130 in order to receive a listing of images responsive to the text-based search query. Turning to the server 130, in step 403, the server 130 receives the request for a listing of images from the client 110.

Subsequently, in step 404, the server 130 can determine one or more image identifiers corresponding to the search query. For example, the search query (or request) may indicate a search term "coffee," and hence, the server 130 may determine an image identifier associated with the search term "coffee." Next, in step 405, the server 130 determines a collection of images associated with the one or more image identifiers. In this respect, the image identifier may be associated with a cluster of images that contain content relevant to the search term "coffee."

Next, in step 406, an identification of a plurality of images from the collection of images 252 that are responsive to the search query is received, particularly images from the collection of images 252 that contain content with a level of authenticity based on an authenticity probability of the image. In this respect, the images represent a subset of the overall number of images in the collection of images 252, thereby reducing the volume of the image search space, and hence decreasing the latency in identifying images with the level of authenticity as requested by the search query.

Subsequently, in step 407 the server 130 provides the client 110 with a listing of the plurality of images that is prioritized according to levels of authenticity among the images (e.g., images are listed in descending order where images with the highest level of authenticity are listed first). Turning to the client 110, in step 408, the client 110 receives the listing of the plurality of images associated with the image search from the server 130. Next, in step 409, the prioritized listing of the plurality of images is provided for display via the application 222 of the client 110.

Figure 5:
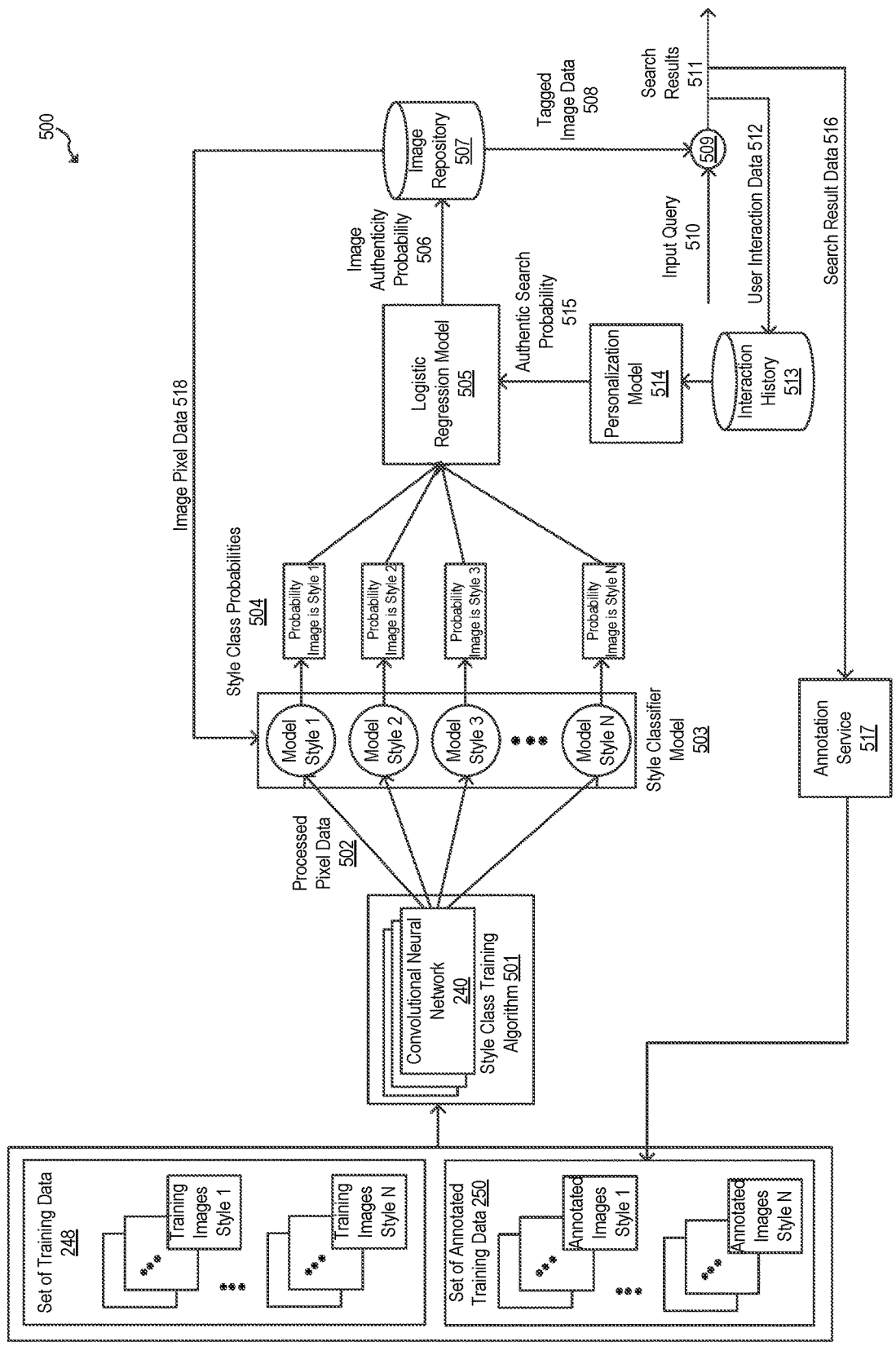
FIG. 5 illustrates a schematic diagram of an example architecture suitable for practicing the example process of FIG. 4.

FIG. 5 illustrates a schematic diagram of an example architecture 500 suitable for practicing the example processes of FIGS. 3A, 3B and 4. The architecture 500 illustrates the processes of FIGS. 3A, 3B and 4 as a two-part process, where elements 501, 503 and 505, for example, relate to a first process that includes a training process of the convolutional neural network 240 to produce a set of style classifiers and a logistic regression model (FIGS. 3A, 3B), and elements 509, 510 and 511, for example, relate to a second process that includes the processing of the user input for the forward image search (FIG. 4). In this respect, the architecture 500 provides for an input search query to search for images corresponding to one or more image identifiers that map, or at least in part, to a term or phrase in the input search query. In one or more embodiments, the operations relating to the first process are performed independent of the operations relating to the second process such that operations in the first process may be performed offline in advance.

The processor 236 of the server 130 may submit a plurality of training images (e.g., set of training data 248) to the convolutional neural network 240 that is configured to analyze pixel data for each of the plurality of training images to identify features in each of the plurality of training images. The convolutional neural network 240, running a style class training algorithm 501, processes the different images in the set of training data 248 to learn to identify features in the images that correspond to a style class. In one or more implementations, the set of training data 248 includes multiple sets of training images, where each set of training images corresponds to one particular style class. In this respect, the convolutional neural network 240 extracts features and transforms these features into a feature descriptor vector for mapping to a style class that corresponds to the particular set of training images. In this example, each style class has its own convolutional neural network. In this respect, weights in a respective convolutional neural network 240 are trained during the training phase, and each of the convolutional neural networks 240 provides processed pixel data 502, such that the processed pixel data 502 maps to a respective style classifier in a style classifier model 503 composed of multiple style classifiers.

The processor 236, using the style classifier model 503, composed of the multiple style classifiers, feeds image pixel data 518 for an image, from the collection of images 252, through a number of style classifiers. For each image, the style classifier model 503 produces multiple style class probabilities 504 using a number of style classifiers. In some embodiments, the process of generating a style class probability from each of the style classifiers may be performed in parallel of one another. Each of the style class probability values (e.g., 504) may indicate the likelihood that an image is a member of a subject style class based on pixel data of the image.

The processor 236, using a logistic regression model 505, accepts an aggregate of the style class probabilities 504 as input to determine an image authenticity probability 506 that the image from the collection of images 252 has some degree of authenticity based on the combined style class probabilities for the image. In some aspects, the logistic regression model 505 is configured to run a specialized authenticity algorithm to generate an authenticity score for a given image for different style classifications that would be responsive to image search queries. In one or more implementations, the authenticity score represents a high-level prediction of the searched content item being an authentic image, for example. In some aspects, the authenticity probabilities represent authenticity scores in a scale of 0 to 100 (where 100 represents most authentic, and 0 represents most non-authentic).

In one or more implementations, the logistic regression model 505 represents a two-dimensional probability waveform (not shown), where the x-dimension refers to the compiled style classes (e.g., vector, illustration, HDR, stock, etc.) and the y-dimension refers to probability values (e.g., 0.0 to 1.0) corresponding to the respective style classes. The logistic regression model 505 may include a distribution waveform of probabilities across a number of style classes. Each of the waveform probabilities may correspond to a respective level of authenticity under a given style class. The logistic regression model 505 may compute a final authenticity score for an image by iteratively processing the input style class probabilities 504 by logical regression.

In one or more implementations, weights may be applied to the logistic regression model 505. A weight value may be applied to one style class. For example, a certain weight may represent that a style class is highly unlikely related to authentic content (such as a style class for "pencil sketch" images). In some aspects, the weights assigned to each of the compiled style classes may be adjustable by a user preference setting.

In one or more implementations, one or more of regression and/or calibration flow operations are performed to find optimal values for the logistic regression model 505. For example, output from a personalization model 514 based on interaction history data 513 may be input back into the logistic regression model 505 to produce a refined distribution of authenticity probability values across the set of style classes to determine a level of authenticity the image most likely represents.

In one or more implementations, one or more of regression and/or calibration flow operations are performed to find optimal values for the style classifier model 503. For example, a set of annotated training data 250 is fed back into the style classifier model 503. In some embodiments, the processor 236, using the convolutional neural network 240, takes as input human-annotated data (e.g., the set of annotated training data 250), to determine a more accurate probability of an image being a particular style class. In one or more implementations, the additional training data (e.g., set of annotated training data 250) may be gathered from targeted searches against a traditional search engine. For example, targeted data can be gathered using an annotation service 517 such as crowd-sourcing approaches (e.g., MTurk, CrowdFlower, etc.). The crowd-sourcing process may include gathering human annotations of the degree of authenticity of a random sample of images. Instead of random images included in the set of training data 248, a more targeted approach may include images whose authenticity is not clearly defined (e.g., an authenticity score in a range of 0.4 to 0.6) from a first pass through the trained authenticity model, and annotate that set of images as additional training data to further train the convolutional neural network 240. For example, a set of about 10,000 random images represented as search result data 516 may be obtained from the search results 511. The search result data 516 may be provided for display to human annotators via the crowd-sourcing platforms, and the users may be prompted to judge on a 1 to 5 scale, for example, the level of authenticity of the displayed image. In other examples, the users may be prompted to choose between "yes" and "no" of whether the image appears authentic, and the submissions by the queried users are aggregated to formulate an overall probability that the image was perceived as authentic. The annotations may include an image identifier along with the aggregated probability for the image. The processor 236, via an application programming interface (API), may access one or more of the crowd-sourcing platforms to obtain the human-annotated images.

The logistic regression model 505 may receive data from an interaction history repository 513 (e.g., interaction history data 254) via a personalization model 514 used to estimate the probability that a user is more or less interested in an authentic image. In one or more implementations, user interaction data 512 from the search results 511 may be gathered to populate entries in the interaction history repository 513. The personalization model 514 may include a logistic regression function that takes as input the authenticity score value of the last N images that the user interacted with as well as the current user query from the interaction history repository 513, where N is a positive integer value. The output from the personalization model 514 is an estimated probability that the current user is looking more or less heavily for authentic content (e.g., authentic search probability 515) given the input query and recent behavior. In one or more implementations, the authentic search probability 515 indicates a proportion of authentic results to non-authentic results. The image search engine 242 can then gather a set of R results, calculate the initial aggregate authenticity scores among the results, and then post-process the results to increase the rank of more authentic results (e.g., 506) until the final results set has the same proportion of authentic results as the estimate from the personalization model 514.

One large potential source of authentic imagery that can further train the style classifier model 503 and/or the logistic regression model 505 may be public domain images from third-party photo sharing online domains that are accessible to the convolutional neural network 240. The logistic regression model 505, for example, may be further refined by building a labeled data set that has a stock photography website's images labeled as "inauthentic" and a photo sharing image collection labeled as authentic. The logistic regression model 505 further trained over these image sets may potentially be applied only to the stock image dataset to assign an authenticity probability.

In turn, the logistic regression model 505 outputs data indicating an image authenticity probability 506 for each example image. The data from the logistic regression model 505 may include metadata for association with the example image in the image repository 507. The metadata may include an image identifier and/or the corresponding authenticity score. The data from the trained authenticity model may be stored separately from image repository 507 or as part of the image repository 507. The operation of building an image search space (e.g., the collection of images 252) may be performed recursively in a closed loop until a set of example images, for a given style class and/or a set of style classes, includes a range of images with varying authentic scores.

The processor 236 of the server 130 is configured to receive an input query 510 from a user. The input query 510 identifies one or more search terms for initiating an image search for authentic content. Upon receiving the input query 510, the processor 236, using the image search engine 242, submits the input query 510 to index the image repository 507 via index element 509.

In turn, the processor 236 then receives an identification of a plurality of images, corresponding to varying levels of authenticity, from the collection of images 252 that are responsive to the search query. The collection of images 252 may be stored in the image repository 507 accessible to the server 130. In one aspect, the plurality of images are tagged (e.g., 508) with a corresponding authenticity score to denote that image's level of authenticity. In some aspects, the tagged image data 508 includes an image identifier along with the pixel data of the image. The processor 236 provides search results 511 with a ranking according to a proportion that the user desires to retrieve more or less authentic content. The processor 236 may provide the ranked search results 511 to the application 222 on the client 110 over the network 150 for display by an output device 214 of the client 110.

In one or more implementations, the processor 236, using the image search engine 242, may obtain an image identifier that corresponds to the input query 510. For example, the input query 510 may include a search term "coffee" such that the image identifier associated with the search term "coffee" is used to index the image repository 507. In this respect, a cluster of images that is relevant to the search term "coffee" are indexed. Among the cluster of images, a subset of style classes corresponding to authentic content may be identified. For example, style classes known to be associated with at least somewhat authentic content (e.g., exceeding an authentic score of about 0.4) are identified. In turn, the processor 236, using the image search engine 242 via the index element 511, may filter images corresponding to the identified style classes. In turn, the filtered images are then provided as part of the search results 511.

In other implementations, the processor 236, using the image search engine 242, may identify and obtain authenticity scores from the collection of images 252 in the image repository 507. The processor 236, using the image search engine 242 via the index element 511, may filter a subset of images corresponding to authenticity scores that exceed a predetermined threshold, where the predetermined threshold may represent a minimum score for an image to be considered as authentic (e.g., authentic score of at least 0.4). In turn, the filtered images are then provided as part of the search results 511.

Figure 6:
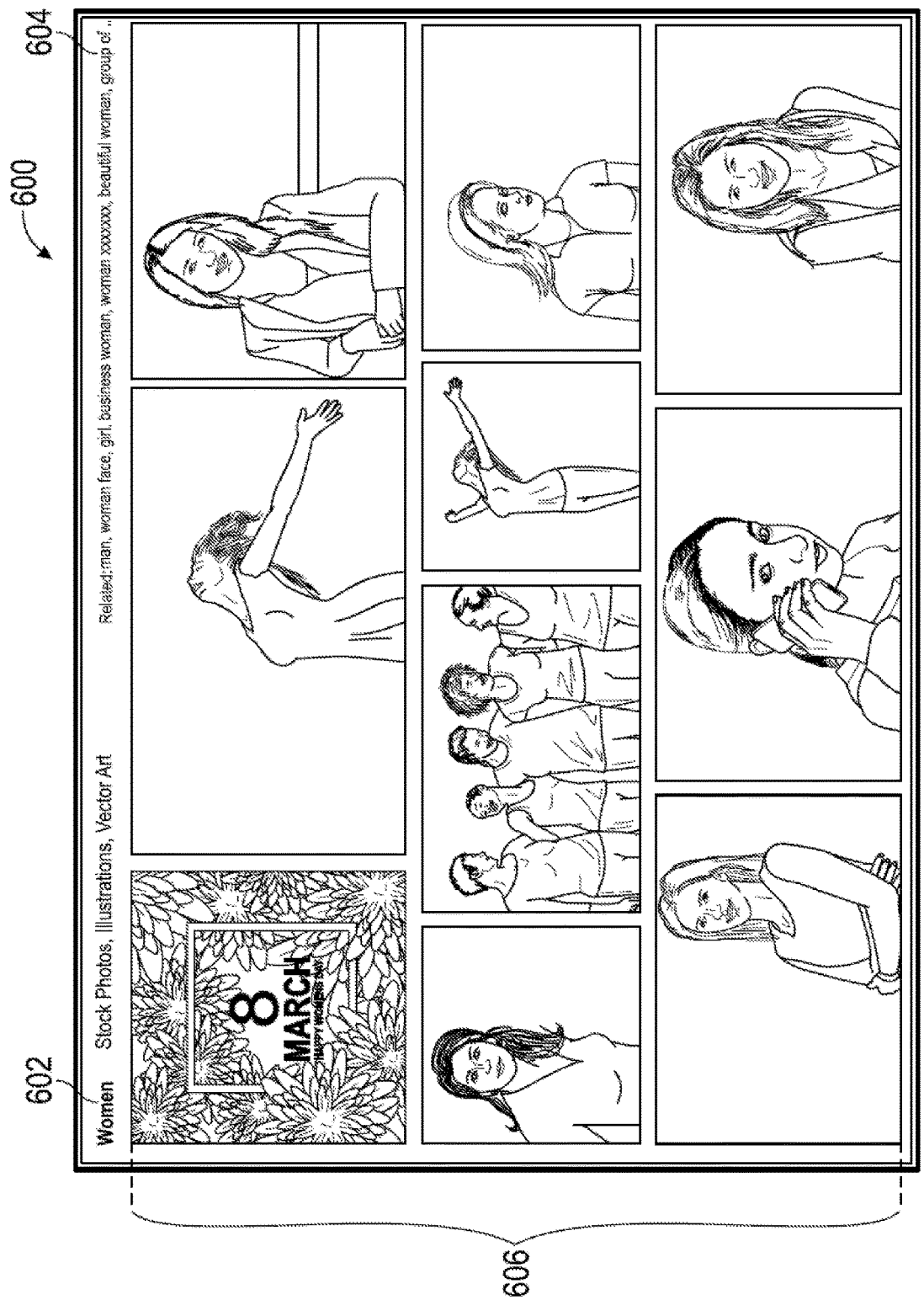
FIG. 6 illustrates an example of image search results responsive to a particular search query.

FIG. 6 illustrates an example of image search results responsive to a particular search query. FIG. 6 provides an example of a user interface 600 for initiating an image search via an application 222 responsive to a given image search query (not shown). The user interface 600 includes an input section (not shown) and an output section 606. The output section 606 includes search results composed of a listing of images. The listing of images includes images corresponding to the search term and/or phrase in the image search query. In this example, the given image search query includes the term "woman," and therefore, the image search service returned the listing of images that includes images of women captured for different types of image attributes.

The user interface 600 includes an indication of one or more types of image attributes selected for a given image search (e.g., 602). In this example, the types of image attributes selected include "stock photos," "illustrations," and "vector art." However, other types of image attributes may be selected, in addition to or in place of those types of image attributes shown in FIG. 6, to refine the images to be returned. In FIG. 6, the user interface 600 also includes an indication listing related search terms (or keywords) for the given image search (e.g., 604) to facilitate the scope of the search. In this respect, images tagged with the related search terms may also be retrieved in response to the given image search query.

Figure 7A:
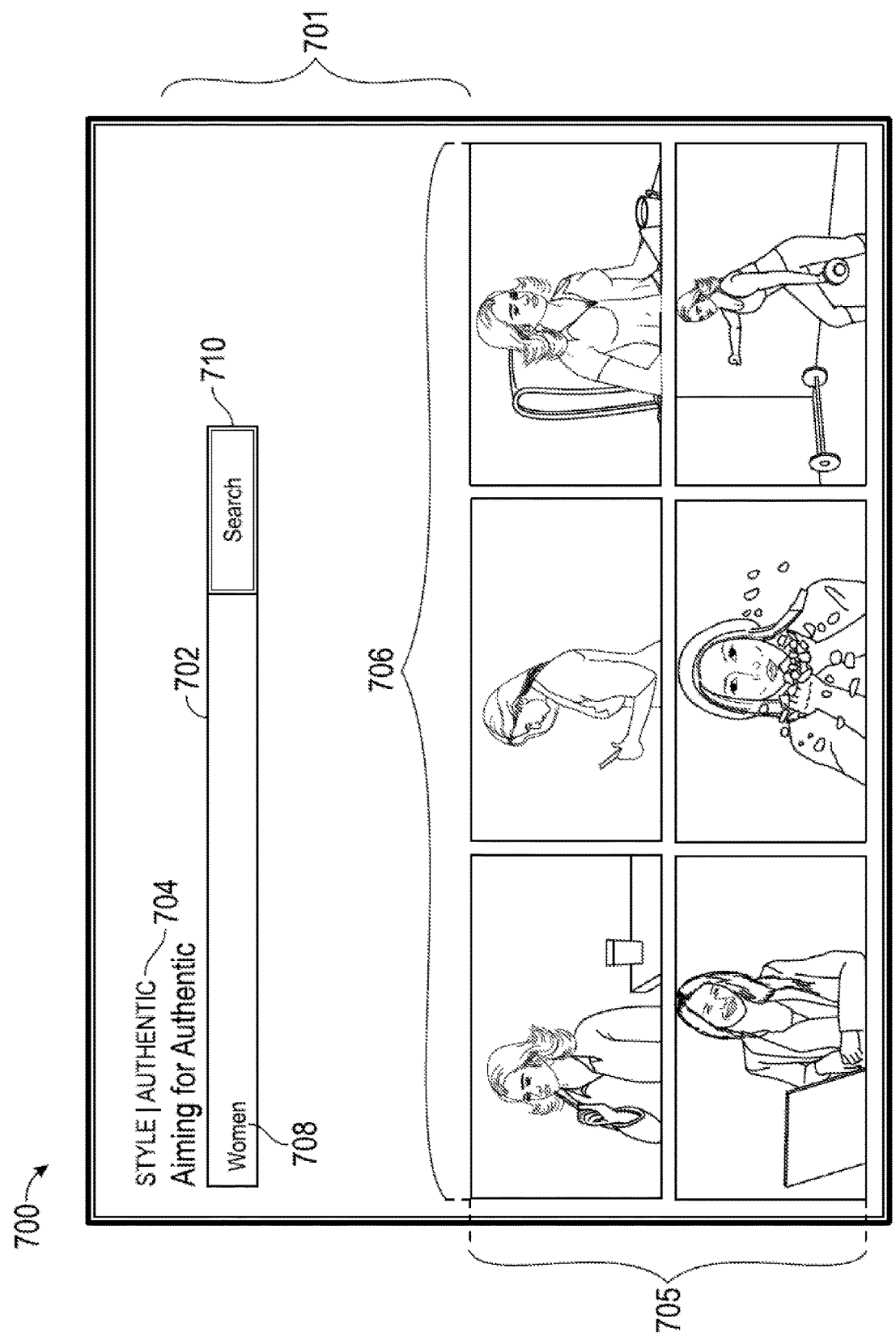
FIGS. 7A and 7B illustrate examples of a user interface for authentic content search by style classification.
Figure 7B:
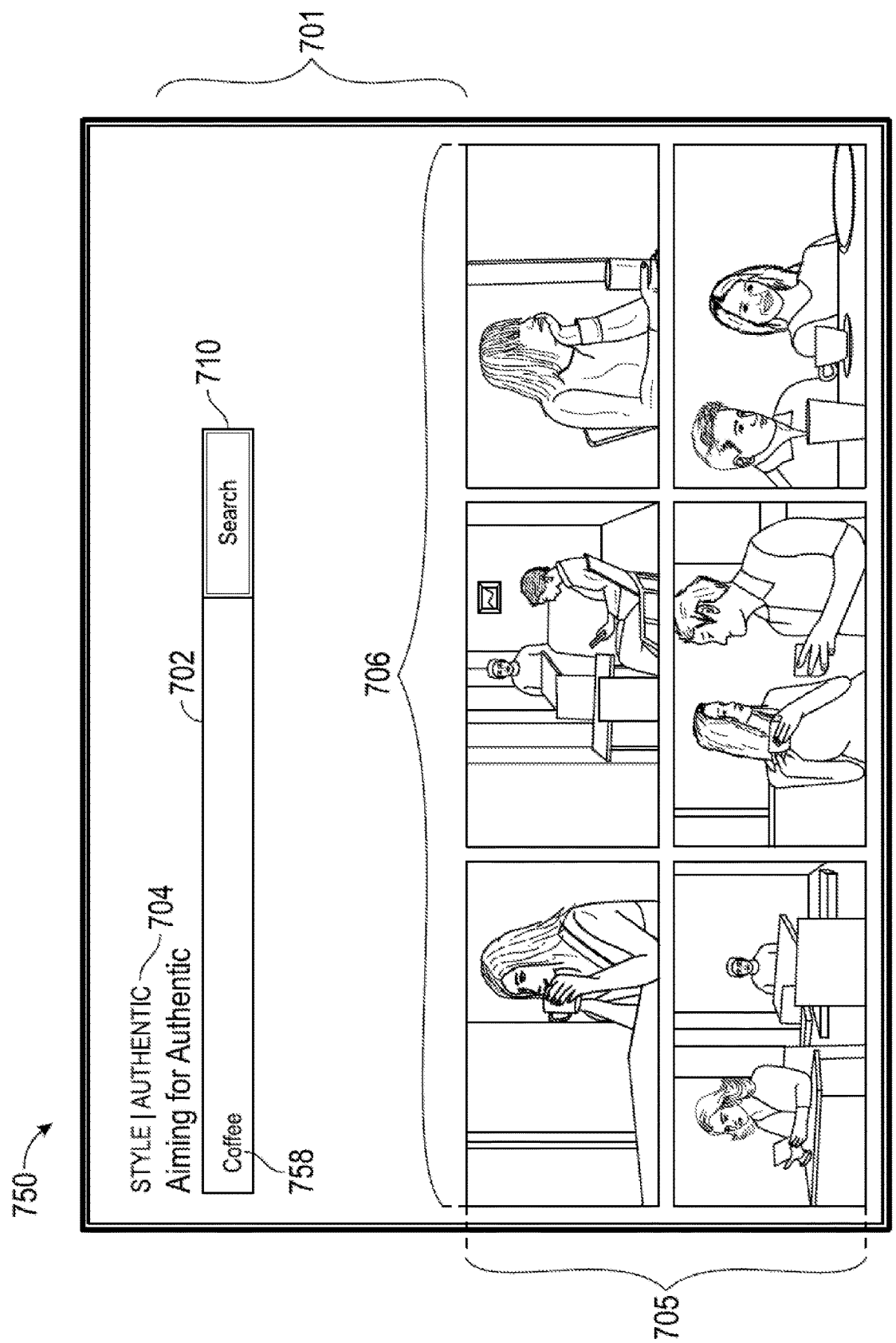

FIGS. 7A and 7B illustrate examples of a user interface for authentic content search by style classification. Specifically, FIG. 7A provides an example of a user interface 700 for initiating an image search via an application 222 responsive to a text-based image search query 708 in a given natural language (e.g., English). In some aspects, the image search may be initiated using different natural languages (e.g., Spanish, French, German, etc.) depending on implementation. FIG. 7A also provides an example illustration of a prioritized listing of images 706 displayed in the user interface 700 responsive to the image search query 708.

In FIG. 7A, the user interface 700 of the application 222 includes an input section 701 for receiving the image search query 708 and an output section 705 for displaying a listing of images 706. The input section 701 includes a search field 702 and a search control 710 for initiating the image search using the received image search query 708. Search results responsive to the image search query 708 are provided for display via the output section 705. In FIG. 7A, the listing of images 706 are displayed in a mosaic-based layout but the listing of images 706 may be in a different layout depending on implementation. The listing of images 706 may include a predetermined layout set by the image search service or by user preferences depending on implementation. In one or more implementations, the layout may be adjusted in real-time based on user interaction with the layout.

The input section 701 also includes an indication of a style classification for a given image search (e.g., 704). In FIG. 7A, the indication indicates that the image search is directed to an authentic content search (e.g., Style Authentic). In some aspects, the indication may include a text notification that reads "Aiming for Authentic" as shown in FIG. 7A. In other aspects, the indication may indicate that the image search is directed to other style classifications (e.g., vector, pattern, HDR, etc.). In some embodiments, the input section 701 includes a user interface control (not shown) that triggers the image search into an authentic content search mode.

In this embodiment, the search results include images corresponding to the search term and/or phrase in the image search query 708. The image search query 708 includes the term "woman," and therefore, the image search returned the listing of images 706 that includes images of women captured in a natural-looking scene, since the image search is directed to retrieving images showing authentic content.

In some embodiments, the listing of images 706 includes images with different authenticity scores. In one or more implementations, at query time, the user interface 700 may allow a faceted search to group items (e.g., the listing of images 706) by their relative authenticity levels, allowing a user to only see, e.g. very authentic, somewhat authentic, or inauthentic ("stock") images. In other implementations, the user interface 700 may have a filter to exclude all "stocky" images from the search results. In this respect, images with an authenticity score below a certain authenticity threshold are excluded (or filtered out). The authenticity threshold may correspond to a boundary that divides "somewhat authentic" images from "inauthentic" images. In some embodiments, the disclosed system allows the user specify the authenticity threshold as part of their request. For example, the user interface 700 may provide a sliding bar (not shown) that allows the user to dial in the relative amount of authenticity the user desires to see in the search results. For the user interface 700, the sliding bar may traverse from a value of 0 to a value of 100 that enables the user to tell the disclosed system "anything with authenticity greater than 0.6 is something I want to see." In other embodiments, the listing of images 706 includes images with a same authenticity score.

FIG. 7B provides an example of a user interface 750 for initiating an image search via an application 222 responsive to a text-based image search query 758. The user interface 750 of the application 222 includes an input section 701 for receiving the image search query 758 and an output section 705 for displaying a listing of images 706. The input section 701 includes the search field 702 and the search control 710 for initiating the image search using the received image search query 758. Search results responsive to the image search query 758 are provided for display via the output section 705.

Similarly to FIG. 7A, the indication indicates that the image search is directed to an authentic content search (e.g., Style Authentic). In this embodiment, the search results include images corresponding to the search term and/or phrase in the image search query 758. The image search query 708 includes the term "coffee," and therefore, the image search returned the listing of images 706 that includes images of persons enjoying a cup of coffee who are captured in a natural-looking scene, since the image search is directed to retrieving images showing authentic content.

Figure 8:
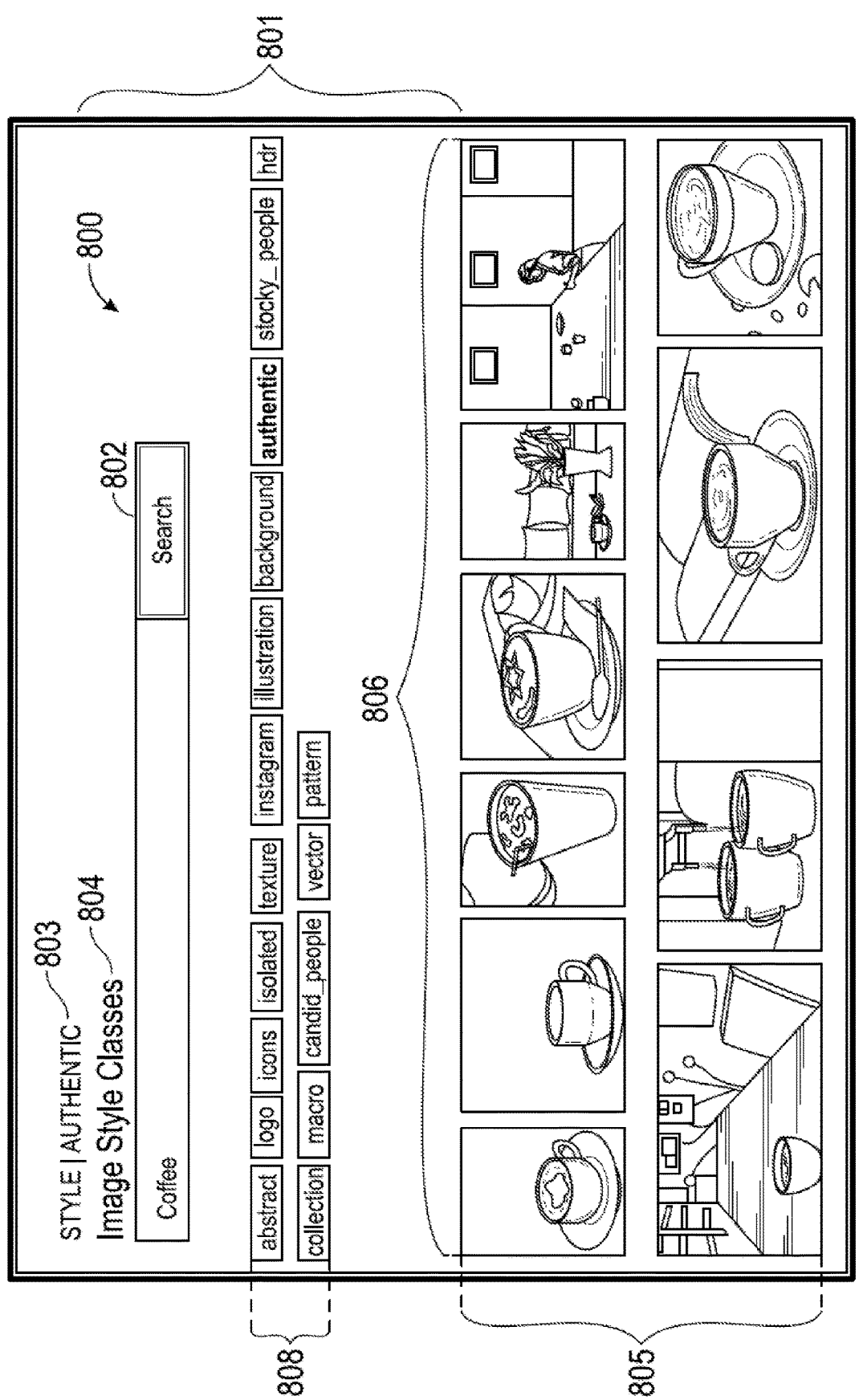
FIG. 8 illustrates an example of a user interface with style class options for authentic content search by style classification.

FIG. 8 illustrates an example of a user interface 800 with style class options for authentic content search by style classification. The user interface 800 of the application 222 includes an input section 801 for receiving an image search query 802 and an output section 805 for displaying a listing of images 806. Search results responsive to the image search query 802 are provided for display via the output section 805. The input section 801 also includes an indication of a style classification for a given image search (e.g., 803). The indication indicates that the image search is directed to an authentic content search (e.g., Style Authentic).

In one or more implementations, the input section 801 includes a listing of style classes 808 available as a means of filtering the image search. The listing of style classes 808 may include graphical elements respectively indicating a different style class that may be selected to refine the images to be returned in response to the image search query 802. In this embodiment, the image search query 802 includes the term "coffee" and the image search is in the authentic content search mode, and therefore, the image search returned the listing of images 806 that includes images of items relating to "coffee," such as cups of coffee or coffee shop baristas, which are captured in a natural-looking scene, since the image search is directed to retrieving images showing authentic content.

Figure 9:
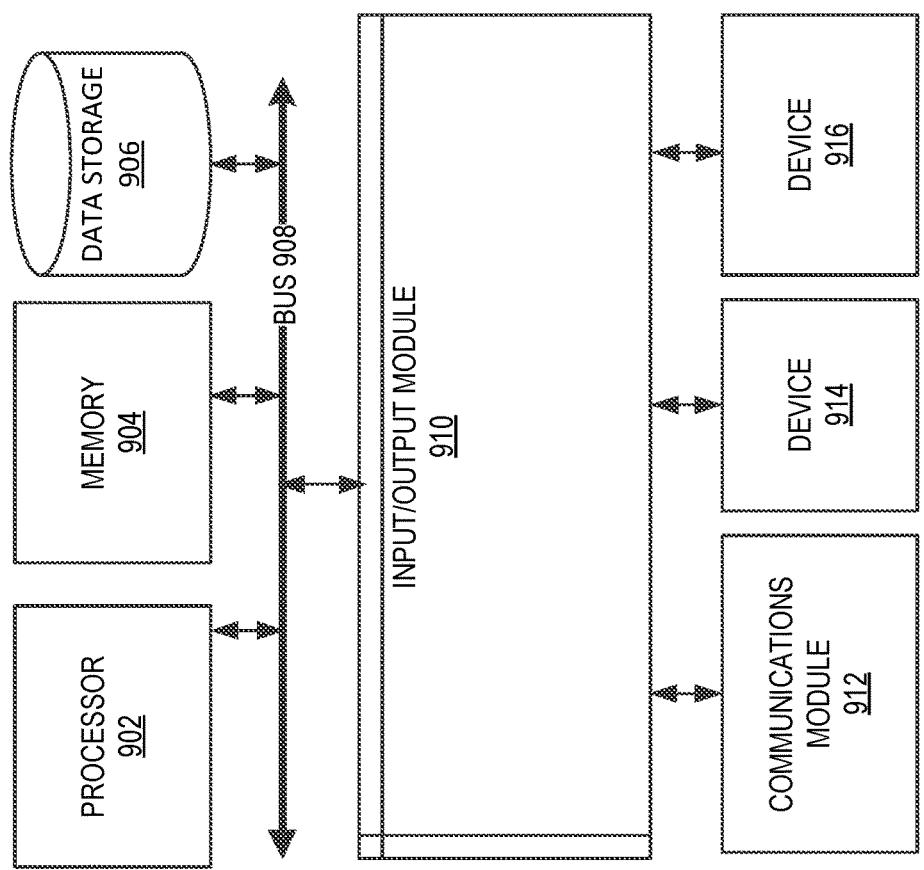
FIG. 9 is a block diagram illustrating an example computer system with which the client and server of FIG. 2 can be implemented.

FIG. 9 is a block diagram illustrating an exemplary computer system 900 with which the client 110 and server 130 of FIG. 1 can be implemented. In certain aspects, the computer system 900 may be implemented using hardware or a combination of software and hardware, either in a dedicated server, or integrated into another entity, or distributed across multiple entities.

Computer system 900 (e.g., client 110 and server 130) includes a bus 908 or other communication mechanism for communicating information, and a processor 902 (e.g., processor 212 and 236) coupled with bus 908 for processing information. By way of example, the computer system 900 may be implemented with one or more processors 902. Processor 902 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 900 can include, in addition to hardware, code that creates an execution environment for the computer program in question, e.g., code that constitutes processor firmware, a protocol stack, a database management system, an operating system, or a combination of one or more of them stored in an included memory 904 (e.g., memory 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 908 for storing information and instructions to be executed by processor 902. The processor 902 and the memory 904 can be supplemented by, or incorporated in, special purpose logic circuitry.

The instructions may be stored in the memory 904 and implemented in one or more computer program products, i.e., one or more modules of computer program instructions encoded on a computer readable medium for execution by, or to control the operation of, the computer system 900, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 904 may also be used for storing temporary variable or other intermediate information during execution of instructions to be executed by processor 902.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 900 further includes a data storage device 906 such as a magnetic disk or optical disk, coupled to bus 908 for storing information and instructions. Computer system 900 may be coupled via input/output module 910 to various devices. The input/output module 910 can be any input/output module. Exemplary input/output modules 910 include data ports such as USB ports. The input/output module 910 is configured to connect to a communications module 912. Exemplary communications modules 912 (e.g., communications modules 218 and 238) include networking interface cards, such as Ethernet cards and modems. In certain aspects, the input/output module 910 is configured to connect to a plurality of devices, such as an input device 914 (e.g., input device 216) and/or an output device 916 (e.g., output device 214). Exemplary input devices 914 include a keyboard and a pointing device, e.g., a mouse or a trackball, by which a user can provide input to the computer system 900. Other kinds of input devices 914 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 916 include display devices, such as a LCD (liquid crystal display) monitor, for displaying information to the user.

According to one aspect of the present disclosure, the client 110 and server 130 can be implemented using a computer system 900 in response to processor 902 executing one or more sequences of one or more instructions contained in memory 904. Such instructions may be read into memory 904 from another machine-readable medium, such as data storage device 906. Execution of the sequences of instructions contained in main memory 904 causes processor 902 to perform the process steps described herein. One or more processors in a multi-processing arrangement may also be employed to execute the sequences of instructions contained in memory 904. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 900 can include clients and servers. A client and server are generally remote from each other and typically interact through a communication network. The relationship of client and server arises by virtue of computer programs running on the respective computers and having a client-server relationship to each other. Computer system 900 can be, for example, and without limitation, a desktop computer, laptop computer, or tablet computer. Computer system 900 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 902 for execution. Such a medium may take many forms, including, but not limited to, non-volatile media, volatile media, and transmission media. Non-volatile media include, for example, optical or magnetic disks, such as data storage device 906. Volatile media include dynamic memory, such as memory 904. Transmission media include coaxial cables, copper wire, and fiber optics, including the wires that comprise bus 908. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
providing a plurality of sets of training images to a computer-operated convolutional neural network, wherein the computer-operated convolutional neural network processes the plurality of sets of training images to learn to identify features relating to at least one of a plurality of style classes, wherein each of the plurality of sets of training images is associated with one style class of the plurality of style classes;
generating feature vectors for each training image in the plurality of sets of training images using the computer-operated convolutional neural network;
generating processed pixel data including the feature vectors from the plurality of sets of training images;
mapping the processed pixel data to a style classifier of a set of style classifiers;
determining a style class probability using the style classifier for a style class of a set of style classes, the style class probability indicating a likelihood that a subject image corresponds to the style class;
receiving user input identifying a search query from a client device, the search query indicating a request for authentic content;
identifying one or more image identifiers corresponding to the search query;
determining images from a collection of images that contain authentic content based on an authenticity score associated with each of the images, the authenticity score indicating for an associated image from the images a probability that the associated image contains content that visually appears to be authentic, and the authenticity score corresponding to how closely the associated image resembles a naturally-occurring situation,
wherein the authenticity score for the associated image is based at least in part on a set of authenticity probabilities associated with style classes detected for the associated image, and
wherein the style classes that are detected for the associated image and the set of authenticity probabilities associated with the style classes for the associated image are determined via machine learning using the computer-operated convolutional neural network;

wherein training the computer-operated convolutional neural network comprises mapping, by the computer-operated convolutional neural network, feature descriptor vectors extracted from training images to a corresponding weighted classifier model for each style class, the weighted classifier model comprising a set of weighted data points where each weighted data point corresponds to a different style, each weighted data point representing a likelihood that the corresponding style is an authentic style;

providing a prioritized listing of the images determined to contain authentic content to the client device; and tagging each of the images with metadata identifying the authenticity score for the image, the metadata comprising one or more rows of data including an image identifier, an image Uniform Resource Locator (URL), and a style class.

2. The computer-implemented method of claim 1, wherein the prioritized listing of the images comprises a plurality of image groupings, wherein the plurality of image groupings comprises images grouped by their relative levels of authenticity.

3. The computer-implemented method of claim 2, further comprising:
providing a user interface control to allow a user to select at least one grouping from the plurality of image groupings;
receiving a user selection of at least one grouping of the plurality of image groupings via the user interface control;
modifying the prioritized listing of images based on the received user selection; and
providing the modified listing of images for display on the client device.

4. The computer-implemented method of claim 2, further comprising:
providing the prioritized listing of images for display on the client device, the prioritized listing of images including the plurality of image groupings;
providing a user interface control to allow a user to exclude at least one grouping from the plurality of image groupings;
receiving a user command to exclude at least one grouping of the plurality of image groupings via the user interface control;
modifying the prioritized listing of images based on the received user command; and
providing the modified listing of images for display on the client device.

5. The computer-implemented method of claim 2, wherein;
providing a user interface control to allow a user to dial in a relative amount of authenticity within the prioritized listing of images;
receiving a user selection that corresponds to a proportionate amount of authenticity within the prioritized listing of images, via the user interface control;
modifying the prioritized listing of images based on the received user selection; and
providing the modified listing of images for display on the client device.

6. The computer-implemented method of claim 1, further comprising:
clustering the feature vectors into a plurality of clusters, wherein at least one of the plurality of clusters is associated with one of the one or more image identifiers.

7. The computer-implemented method of claim 1, further comprising:
providing an aggregate of style class probabilities to a logistic regression model, the aggregate of style class probabilities including a style class probability for each style class in the set of style classes.

8. The computer-implemented method of claim 7, further comprising:
combining a plurality of style class probabilities from the set of style classifiers to form the aggregate of style class probabilities,
wherein the authenticity score is determined based on the aggregate of the style class probabilities via the logistic regression model.

9. The computer-implemented method of claim 6, further comprising:
obtaining historical user interaction data, the historical user interaction data indicating a number of prior images that a user interacted with in prior image search queries over a given period of time;
parsing the historical user interaction data to obtain an authenticity probability for each image in the number of prior images;
providing authenticity probabilities of the last N images from the number of prior images to the computer-operated convolutional neural network, where N is a positive integer; and
generating a search probability from the provided authenticity probabilities of the last N images using the computer-operated convolutional neural network, the search probability indicating a probability that a user is searching for authentic content,
wherein the prioritized listing of images includes a number of images that contain authentic content at a proportion that corresponds to the search probability.

10. The computer-implemented method of claim 6, wherein the set of training images comprises a plurality of annotated training images, the plurality of annotated training images including training images annotated to indicate a level of authenticity for the training image.

11. The computer-implemented method of claim 6, further comprising:
determining a subset of images in the collection of images that respectively include an authenticity score within a predetermined range of authenticity scores;
providing the subset of images to a third-party crowd-sourcing service for annotation of the subset of images;
receiving the subset of images with annotations set by users of the third-party crowd-sourcing service, the annotations respectively indicating a level of authenticity for an image in the subset of images; and
providing the subset of images with the annotations as part of the set of training images to the computer-operated convolutional neural network.

12. A system comprising:
one or more processors;
a computer-readable storage medium coupled to the one or more processors, the computer-readable storage medium including instructions that, when executed by the one or more processors, cause the one or more processors to:
provide a plurality of sets of training images to a computer-operated convolutional neural network, wherein the computer-operated convolutional neural network processes the plurality of sets of training images to learn to identify features relating to at least one of a plurality of style classes, wherein each of the plurality of sets of training images is associated with one style class of the plurality of style classes;
generate feature vectors for each training image in the plurality of sets of training images using the computer-operated convolutional neural network;
generate processed pixel data including the feature vectors from the plurality of sets of training images;
map the processed pixel data to a style classifier of a set of style classifiers;
determine a style class probability using the style classifier for a style class of a set of style classes, the style class probability indicating a likelihood that a subject image corresponds to the style class;
receive a search query identifying one or more search terms;
determine that the one or more search terms respectively correspond to one or more image identifiers;
identify a collection of images corresponding to one or more image identifiers;
determine an authenticity probability for each image in the collection of images,
wherein the authenticity probability for a respective image in the collection of images corresponds to how closely the respective image resembles a naturally-occurring situation,
wherein the authenticity probability for the respective image in the collection of images is based at least in part on a set of authenticity probabilities associated with style classes detected for the respective image, and
wherein the style classes that are detected for the respective image and the set of authenticity probabilities that are detected for the respective image are determined via machine learning using the computer-operated convolutional neural network;
wherein training the computer-operated convolutional neural network cause the one or more processors to map, by the computer-operated convolutional neural network, feature descriptor vectors extracted from training images to a corresponding weighted classifier model for each style class, the weighted classifier model comprising a set of weighted data points where each weighted data point corresponds to a different style, each weighted data point representing a likelihood that the corresponding style is an authentic style;
identify a subset of images having authenticity probabilities that exceed a predetermined threshold, the predetermined threshold identifying a boundary between authentic and non-authentic content;
generate search results identifying a prioritized listing of the subset of the images;
tag each of the images with metadata identifying the authenticity score for the image, the metadata comprising one or more rows of data including an image identifier, an image Uniform Resource Locator (URL), and a style class; and
provide the search results for display on a client device.

13. The system of claim 12, wherein the instructions further cause the one or more processors to:
cluster the feature vectors into a plurality of clusters, wherein at least one of the plurality of clusters is associated with one of the one or more image identifiers.

14. The system of claim 13, wherein the instructions further cause the one or more processors to:
provide an aggregate of style class probabilities to a logistic regression model from the set of style classifiers, the aggregate of style class probabilities including a style class probability for each style class in the set of style classes.

15. The system of claim 14, wherein the instructions further cause the one or more processors to:
combine a plurality of style class probabilities from the set of style classifiers to form the aggregate of the style class probabilities,
wherein the authenticity probability is determined based on the aggregate of the style class probabilities via the logistic regression model.

16. The system of claim 13, wherein the instructions further cause the one or more processors to:
obtain historical user interaction data, the historical user interaction data indicating a number of prior images that a user interacted with in prior image search queries over a given period of time;
parse the historical user interaction data to obtain an authenticity probability for each image in the number of prior images;
provide the authenticity probabilities of the last N images from the number of prior images to the computer-operated convolutional neural network, where N is a positive integer; and
generate a search probability from the provided authenticity probabilities of the last N images using the computer-operated convolutional neural network, the search probability indicating a probability that a user is searching for authentic content,
wherein the prioritized listing of images includes a number of images that contain authentic content at a proportion that corresponds to the search probability.

17. The system of claim 13, wherein the instructions further cause the one or more processors to:
determine a subset of images in the collection of images that respectively include an authenticity score within a predetermined range of authenticity scores;
provide the subset of images to a third-party crowd-sourcing service for annotation of the subset of images;
receive the subset of images with annotations set by users of the third-party crowd-sourcing service, the annotations respectively indicating a level of authenticity for an image in the subset of images; and
provide the subset of images with the annotations as part of the set of training images to the computer-operated convolutional neural network.

18. A computer-implemented method, comprising:
providing a plurality of sets of training images to a computer-operated convolutional neural network, wherein the computer-operated convolutional neural network processes the plurality of sets of training images to learn to identify features relating to at least one of a plurality of style classes, wherein each of the plurality of sets of training images is associated with one style class of the plurality of style classes;
generating feature vectors for each training image in the plurality of sets of training images using the computer-operated convolutional neural network;
generating processed pixel data including the feature vectors from the plurality of sets of training images;
mapping the processed pixel data to a style classifier of a set of style classifiers;
determining a style class probability using the style classifier for a style class of a set of style classes, the style class probability indicating a likelihood that a subject image corresponds to the style class;

receiving user input via an application on a client device, the user input indicating a request to initiate an image search for authentic content;

generating, in response to the received user input, an image search query including one or more search terms from the user input;

providing for transmission the image search query over a connection to a server, the server including an image search service that identifies one or more images that contain authentic content based on an authenticity probability associated with each of the one or more images, the authenticity probability indicating a level of authenticity for the image that corresponds to how closely the image resembles a naturally-occurring situation, the authenticity probability being based on an aggregation of style class authenticity probabilities, each of the style class authenticity probabilities indicating a likelihood that a subject image is authentic for a corresponding style class, and the style class authenticity probabilities being determined via machine learning using the computer-operated convolutional neural network;

wherein training the computer-operated convolutional neural network comprises mapping, by the computer-operated convolutional neural network, feature descriptor vectors extracted from training images to a corresponding weighted classifier model for each style class, the weighted classifier model comprising a set of weighted data points where each weighted data point corresponds to a different style, each weighted data point representing a likelihood that the corresponding style is an authentic style;

receiving a prioritized listing of images over the connection in response to the image search query;

tagging each of the images with metadata identifying the authenticity score for the image, the metadata comprising one or more rows of data including an image identifier, an image Uniform Resource Locator (URL), and a style class; and providing for display the prioritized listing of images.

19. The computer-implemented method of claim 18, wherein the prioritized listing of the images comprises a plurality of image groupings, wherein the plurality of image groupings comprises images grouped by their relative levels of authenticity.

* * * * *